(12) United States Patent  (10) Patent No.: US 8,902,129 B2
Mitsunaga  (45) Date of Patent: Dec. 2, 2014

(54) PORTABLE ELECTRONIC APPARATUS

(75) Inventor: Naoki Mitsunaga, Yokohama (JP)

(73) Assignee: Kyocera Corporation, Kyoto (JP)

( * ) Notice: Subject to any disclaimer, the term of this patent is extended or adjusted under 35 U.S.C. 154(b) by 272 days.

(21) Appl. No.: 13/336,265

(22) Filed: Dec. 23, 2011

(65) Prior Publication Data

US 2012/0162048 A1 Jun. 28, 2012

(30) Foreign Application Priority Data

Dec. 24, 2010 (JP) ................................ 2010-288787

(51) Int. Cl.
| | |
|---|---|
| H04M 1/00 | (2006.01) |
| G09G 5/00 | (2006.01) |
| H04B 1/38 | (2006.01) |
| G06F 1/16 | (2006.01) |
| G06F 3/14 | (2006.01) |
| G06F 3/147 | (2006.01) |

(52) U.S. Cl.
CPC .............. *G06F 3/1423* (2013.01); *G06F 3/147* (2013.01); *G09G 2300/0473* (2013.01); *G09G 2330/021* (2013.01); *G09G 2380/14* (2013.01)
USPC ..... 345/1.3; 345/1.1; 361/679.3; 361/679.56; 455/556.2; 455/566; 455/575.3; 455/575.4

(58) Field of Classification Search
CPC ... G09G 3/34; G09G 3/3453; G09G 2300/02; G09G 2300/026; G09G 2380/16
USPC ........... 345/1.1, 173–177; 361/679.3, 679.56; 455/556.2, 566, 575.2, 575.3; 715/780, 715/781, 864
See application file for complete search history.

(56) References Cited

U.S. PATENT DOCUMENTS

| 8,750,939 B2 * | 6/2014 | Song et al. ..................... 455/566 |
| 2005/0037816 A1 * | 2/2005 | Morita et al. ................. 455/566 |
| 2007/0070184 A1 * | 3/2007 | Kim et al. .................. 348/14.02 |

(Continued)

FOREIGN PATENT DOCUMENTS

| JP | 2005184267 A | 7/2005 |
| JP | 2008160852 A | 7/2008 |

(Continued)

OTHER PUBLICATIONS

Office Action mailed May 27, 2014, corresponds to Japanese patent application No. 2010-288787, for which an explanation of relevance is attached.

*Primary Examiner* — Dwayne Bost
*Assistant Examiner* — Stefan M Oehrlein
(74) *Attorney, Agent, or Firm* — Lowe Hauptman & Ham, LLP

(57) ABSTRACT

According to an aspect, a portable electronic apparatus includes a housing, a first display unit, a first operating unit, a second display unit, a second operating unit, and a control unit. The housing is configured to change between a first form and a second form. The first display unit and the first operating unit are exposed to the outside in the first form, and the second display unit and second operating unit are exposed to the outside in the second form. The second display unit is configured to display information in a system different from the first display unit. The control unit is configured such that first information displayed on the first display unit is updated based on an operation received by the first operating unit, and second information displayed on the second display unit is updated based on an operation received by the second operating unit.

12 Claims, 13 Drawing Sheets

(56) References Cited

U.S. PATENT DOCUMENTS

| | | | |
|---|---|---|---|
| 2010/0048253 A1* | 2/2010 | Park et al. | 455/566 |
| 2010/0100839 A1* | 4/2010 | Tseng et al. | 715/780 |
| 2010/0188350 A1* | 7/2010 | Sawada | 345/173 |
| 2010/0227651 A1* | 9/2010 | Kim | 455/566 |
| 2010/0285845 A1* | 11/2010 | Sawada et al. | 455/566 |
| 2011/0294555 A1* | 12/2011 | Happonen et al. | 455/575.4 |

FOREIGN PATENT DOCUMENTS

| | | |
|---|---|---|
| JP | 20104326 A | 1/2010 |
| JP | 2010134683 A | 6/2010 |
| JP | 4543319 B2 | 9/2010 |

* cited by examiner

PORTABLE ELECTRONIC APPARATUS

This application claims priority from Japanese Application No. 2010-288787, filed on Dec. 24, 2010, the content of which is incorporated by reference herein in its entirety.

BACKGROUND

1. Technical Field

The present disclosure relates to a portable electronic apparatus.

2. Description of the Related Art

There has been proposed a portable electronic apparatus including an electronic paper as a display device for displaying characters and graphic forms (e.g., Japanese Patent Application Laid-Open No. 2006-243521). The electronic paper is characterized by being able to maintain display content without a continued supply of power, thus contributing to power saving in a portable electronic apparatus.

However, compared to a liquid crystal display (LCD) and an Organic Electro-Luminescence display (OELD), the electronic paper has drawbacks such as low response speed and difficulty in high definition display of color. Because of this, the above-discussed portable electronic apparatuses using the electronic paper as a display panel have not been suitable for appreciating or viewing images or moving pictures.

For the foregoing reasons, there is a need for a portable electronic apparatus that can be used for a wider variety of purposes while achieving power saving.

SUMMARY

According to an aspect, a portable electronic apparatus includes a housing, a first display unit, a second display unit, and a control unit. The housing is configured to change from a first form to a second form or from the second form to a first form. The first display unit is exposed to outside in the first form and provided with no light-emitting source. The first operating unit is exposed to the outside at least in the first form. The second display unit is exposed to the outside in the second form and configured to display information in a system different from the first display unit. The second operating unit is exposed to the outside in the second form. The control unit is configured such that first information displayed on the first display unit is updated based on an operation received by the first operating unit, and second information displayed on the second display unit is updated based on an operation received by the second operating unit.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components. The present invention can be applied to any type of portable electronic apparatuses, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
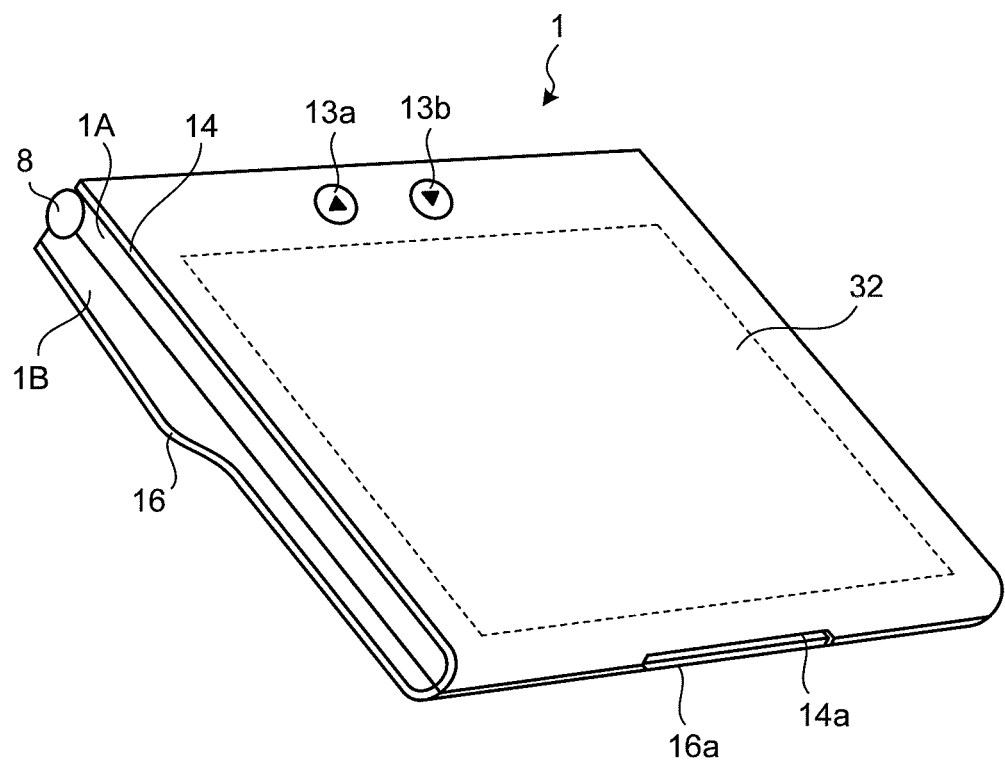
FIG. 1 is a perspective view of a portable electronic apparatus in a closed state.
Figure 2:
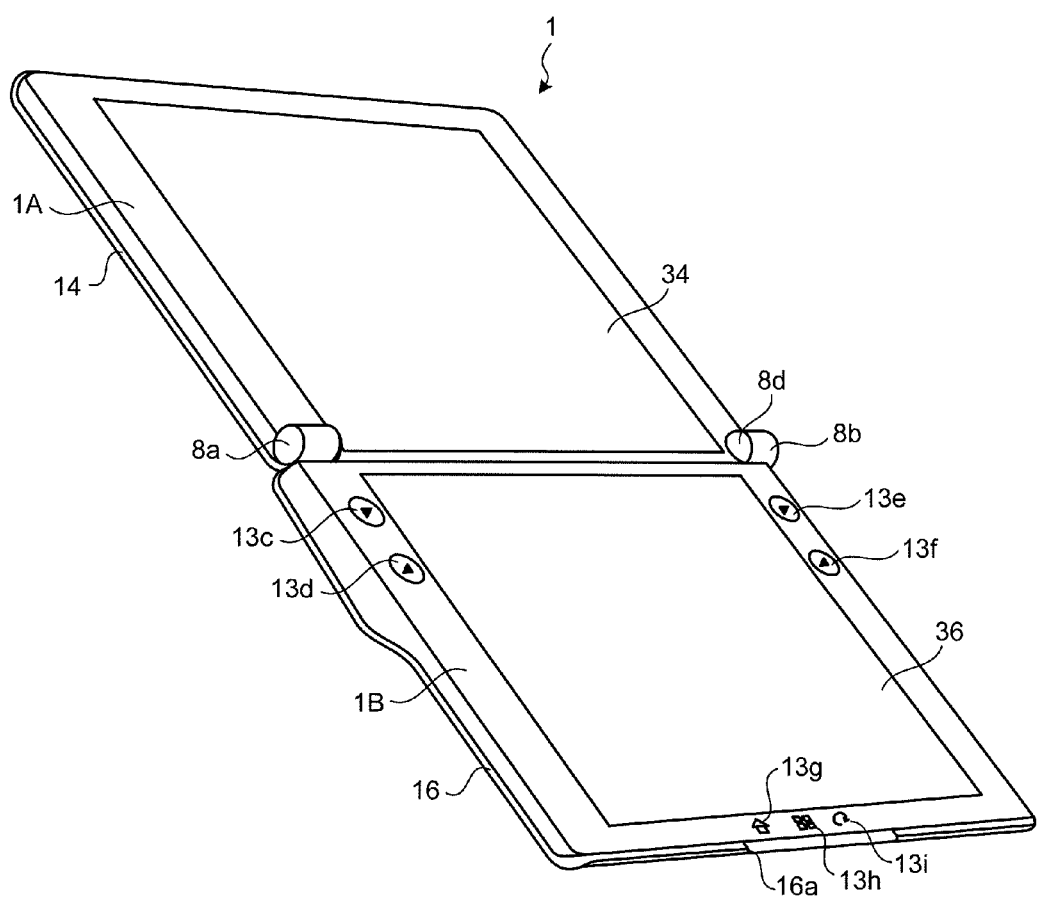
FIG. 2 is a perspective view of the portable electronic apparatus in an open state.

The overall configuration of the portable electronic apparatus 1 that is one embodiment of the electronic apparatus according to the present invention will now be described with reference to FIGS. 1 and 2. FIG. 1 is a perspective view of the portable electronic apparatus 1 in a closed state. FIG. 2 is a perspective view of the portable electronic apparatus in an open state.

As illustrated in FIGS. 1 and 2, the portable electronic apparatus 1 includes a first housing 1A, a second housing 1B, and a hinge mechanism 8. The hinge mechanism 8 connects the first and second housings 1A and 1B so that they are rotatable relative to each other. That is, the portable electronic apparatus 1 has a foldable housing.

In the housing 1A, one of the faces having the largest surface areas is provided with a first display unit 32, buttons 13a and 13b, and a cover 14. The first display unit 32 includes a display panel not provided with a light-emitting source but having a memory function, such as an electronic paper. Here, "having a memory function" refers to "being able to hold a display content even after the supply of power has been stopped". The buttons 13a and 13b are used for operations such as turning a page of information displayed on the first display unit 32. The cover 14 is a transparent or semitransparent member formed from, for example, resin.

Additionally, the first housing 1A includes a second display unit 34 on a face opposite the face that is provided with the first display unit 32. The second display unit 34 has a display panel (e.g., a liquid crystal display panel or organic EL panel) that displays information in a system different from the display panel of the first display unit 32. The display panel of the second display unit 34 is superior to that of the first display unit 32 in at least response speed, the number of colors, or color definition.

In the second housing 1B, one of the faces having the largest surface areas is provided with a third display unit 36, buttons 13c to 13i, and a cover 16. The display unit 36 has a display panel of the same type as that of the second display unit 34. The buttons 13c to 13f are used for operations such as turning pages of information displayed on the second and third display units 34 and 36. The buttons 13g to 13i are used for calling various functions provided by an operating system incorporated in the portable electronic apparatus 1. The cover 16 is a transparent or semitransparent member made of the same material as that of the cover 14.

In a closed state as illustrated in FIG. 1, the portable electronic apparatus 1 has a folded shape in that the face provided with the second display unit 34 of the first housing 1A and the face provided with the third display unit 36 of the second housing 1B are disposed opposite each other. In this shape, the surface area of exposed portions is minimized, and it is suitable for carrying the portable electronic apparatus 1. In the closed state, the first display unit 32 and buttons 13a and 13b are exposed to the outside. This allows a user to read information displayed on the first display unit 32 or to switch information displayed on the first display unit 32 by operating the buttons 13a and 13b.

In an open state as illustrated in FIG. 2, the portable electronic apparatus 1 has a shape in which the face provided with the second display unit 34 of the first housing 1A and the face provided with the third display unit 36 of the second housing 1B are arranged in the same plane while exposed to the outside. In an open state, the second and third display units 34 and 36 are substantially identical in width in the direction parallel to the boundary between the first and second housings 1A and 1B, and are arranged such that one of the ends of each of the second and third display units 34 and 36 is disposed close to the boundary. In the open state, the portable electronic apparatus 1 controls the thus connected second and third display units 34 and 36 as one display unit, and displays information over the second and third display units 34 and 36.

As described above, the portable electronic apparatus 1 is usable in both the closed state and the open state. In the closed state, a user is able to read information displayed on the first display unit 32. Since the display panel of the first display unit 32 has a memory function, power consumption is less when the portable electronic apparatus 1 is used in the closed state.

In the open state, the second and third display units 34 and 36 are disposed in the same plane, with almost no distance between them. Accordingly, the portable electronic apparatus 1 enables a user to read information in a wide display area over the second and third display units 34 and 36. Furthermore, since the display panels of the second and third display units 34 and 36 are superior to the display panel of the first display unit 32 in respects other than power consumption, the portable electronic apparatus 1 in its open state can be used for a wider variety of purposes than that in its closed state.

As described above, the portable electronic apparatus 1 can save power and has more diverse possibilities for use.

Figure 3:
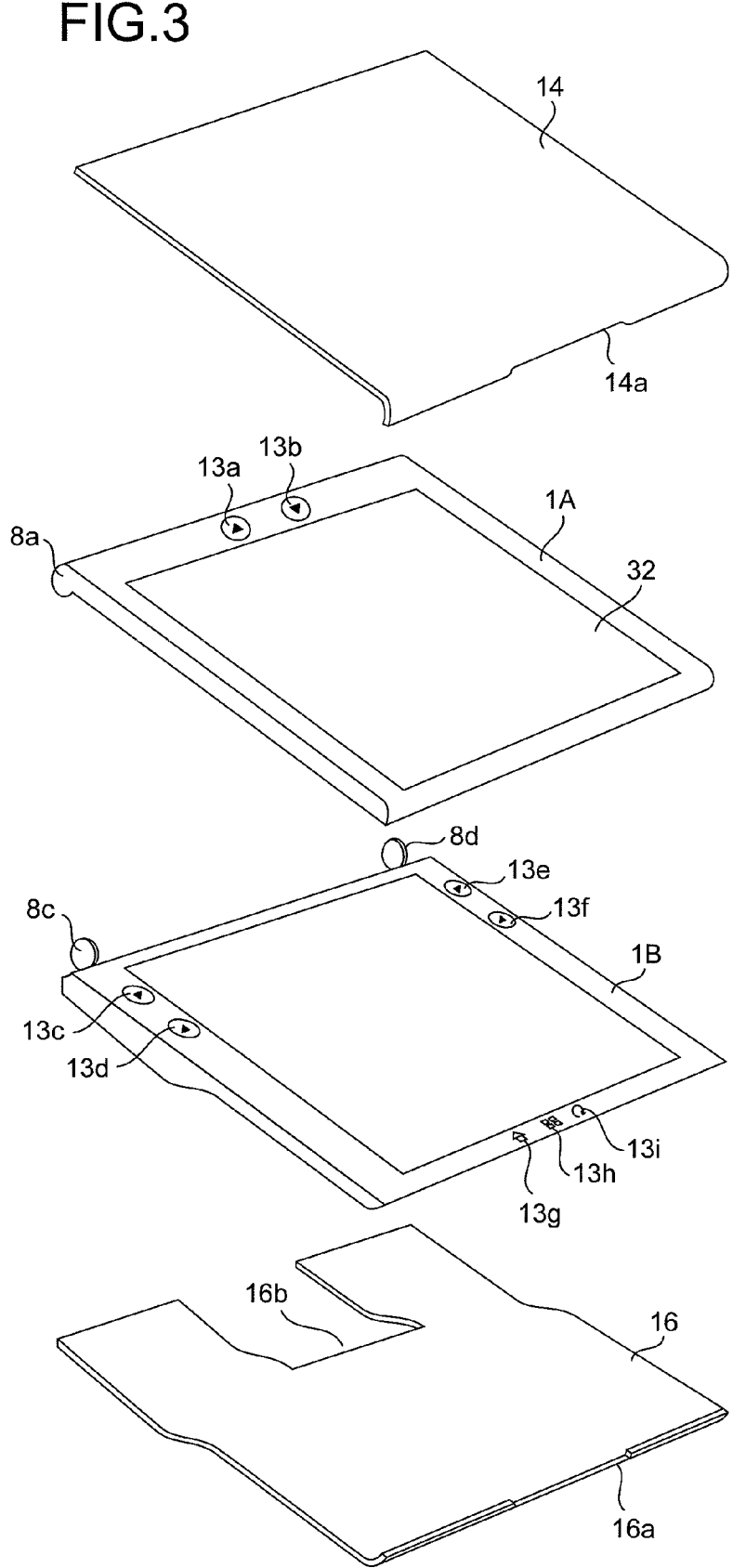
FIG. 3 is an exploded perspective view of the portable electronic apparatus.
Figure 8:
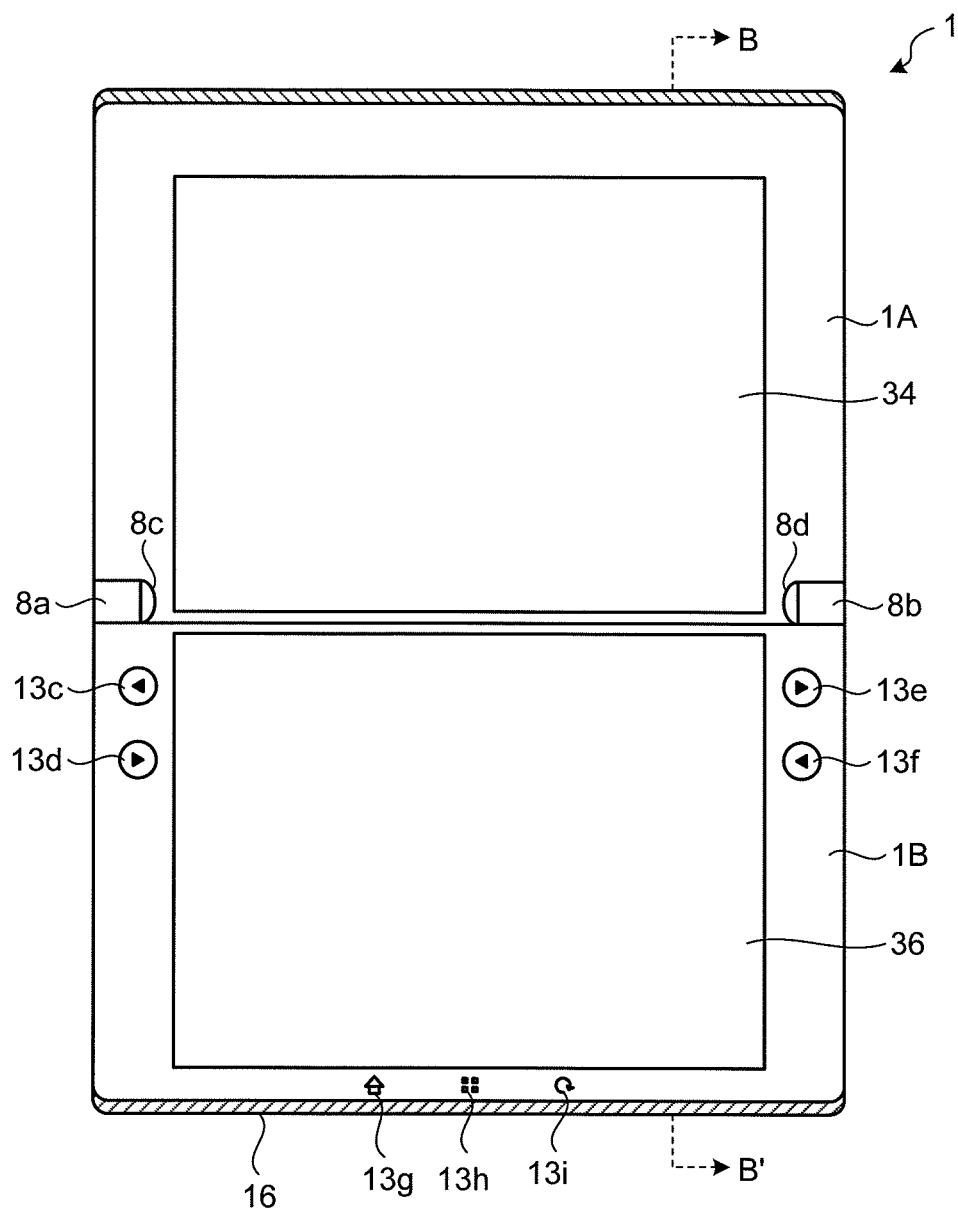
FIG. 8 is a plan view of the portable electronic apparatus in an open state.
Figure 9:
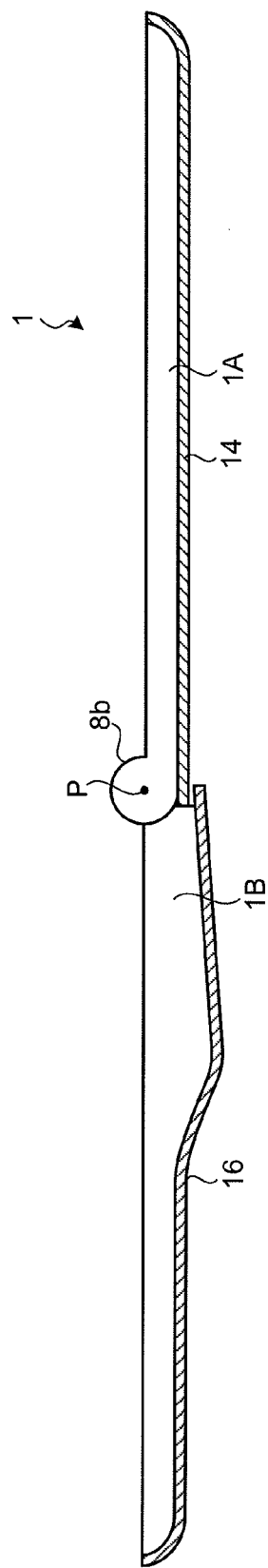
FIG. 9 is a side view of the portable electronic apparatus in an open state.
Figure 10:
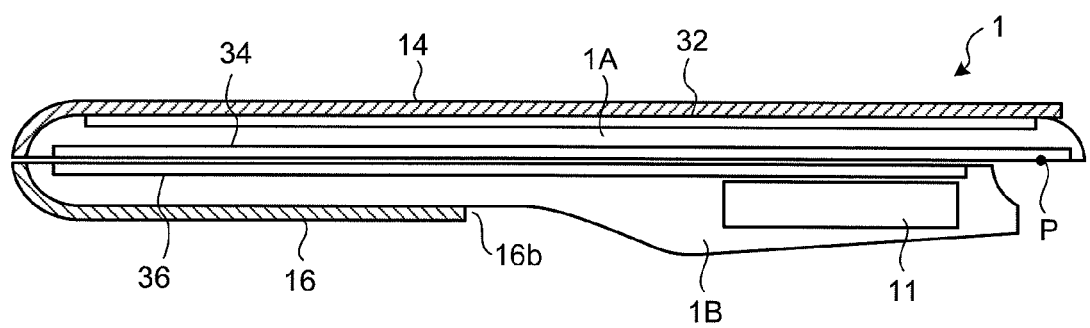
FIG. 10 is a schematic view of a cross-section taken along the line A-A' of the portable electronic apparatus in a closed state.
Figure 11:
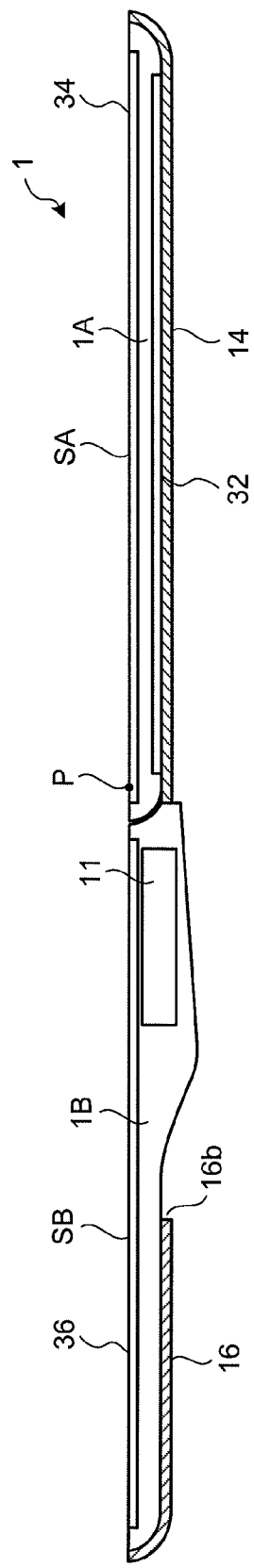
FIG. 11 is a schematic view of a cross-section taken along the line B-B' of the portable electronic apparatus in an open state.

The configuration of the portable electronic apparatus 1 will now be described in more detail with reference to FIGS. 3 to 11. FIG. 3 is an exploded perspective view of the portable electronic apparatus 1. FIGS. 4 to 7 are a front view, a plan view, a bottom view, and a side view, respectively, of the portable electronic apparatus 1 in the closed state. FIGS. 8 and 9 are a plan view and a side view, respectively, of the portable electronic apparatus 1 in the open state. FIG. 10 is a schematic view of a cross-section taken along a line A-A' of the portable electronic apparatus 1 in the closed state. FIG. 11 is a schematic view of a cross-section taken along a line B-B' of the portable electronic apparatus 1 in the open state. In FIGS. 10 and 11, the configuration of the inner part of the apparatus is illustrated in a simple way.

As illustrated in FIGS. 3, 8, and so on, the hinge mechanism 8 includes projecting structures 8a and 8b provided on the first housing 1A, and projecting structures 8c and 8d provided on the second housing 1B. The projecting structures 8a and 8c are joined near one of the ends of the boundary between the first and second housings 1A and 1B in the open state of the apparatus 1. The projecting structures 8b and 8d are joined near the other end of the boundary.

Thus, the hinge mechanism 8 is configured to connect the first and second housings 1A and 1B near both ends of the boundary of the first and second housing 1A and 1B in the open state. This eliminates the need for a middle part of the boundary between the first and second housings 1A and 1B to have a structure for connecting the first and second housings 1A and 1B. Accordingly, the second and third display units 34 and 36 can be disposed close to each other near the boundary.

As illustrated in FIG. 11, the portable electronic apparatus 1 is configured such that a face SA provided with the second display unit 34 of the first housing 1A and a surface SB provided with the third display unit 36 of the second housing 1B are arranged in a line in the same plane in the open state. Therefore, in the open state, the second and third displays 34 and 36 can be arranged without any level difference.

To implement the structure described above, the hinge mechanism 8 is disposed so that a rotation axis P is located on the line of intersection of the respective faces, extended from the faces SA and SB in the course of rotation. The rotation axis P is an axis around which the first and second housings 1A and 1B rotate relative to each other. Therefore, as illustrated in FIG. 9, the faces SA and SB in the open state of the portable electronic apparatus 1 are located in the same plane passing through the rotation axis P.

The portable electronic apparatus 1 has the following configurations so as to keep the faces SA and SB located in the same plane in the open state of the apparatus 1: since a face and cover 14 of the first housing 1A abut on a face of the second housing 1B in an open state, as illustrated in FIG. 11, the portable electronic apparatus 1 is restricted so as to prevent the faces SA and SB from rotating more than 180 degrees relative to each other; and in the open state of the portable electronic apparatus 1, the covers 14 and 16 engage with each other as illustrated in FIG. 9 such that the apparatus 1 is prevented from being switched to the closed state unless force exceeding a predetermined magnitude is applied.

Figure 6:
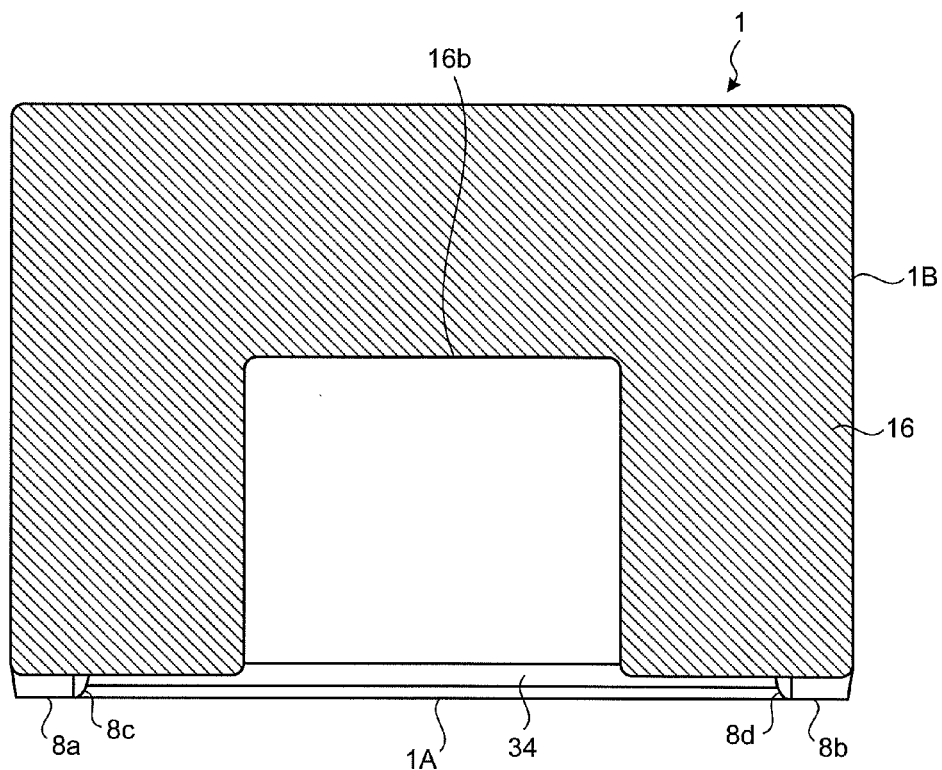
FIG. 6 is a bottom view of the portable electronic apparatus in a closed state.
Figure 7:
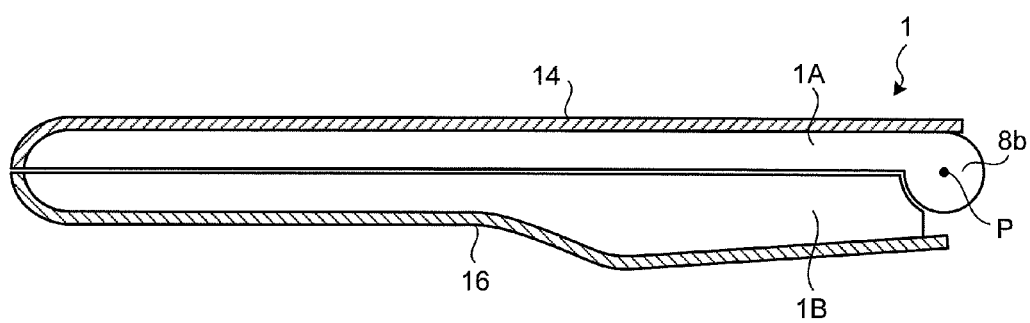
FIG. 7 is a side view of the portable electronic apparatus in a closed state.

As illustrated in FIGS. 8 and 11, the shape of the first housing 1A is such that in an open state, the face SA extends into the second housing 1B beyond the rotation axis P. By virtue of this, the second display unit 34, disposed near the boundary between the first and second housings 1A and 1B in the open state of the apparatus 1, is partly exposed to the outside in the closed state, as illustrated in FIG. 6. The portable electronic apparatus 1 may display character(s) or symbol(s) on the exposed portion of the second display unit 34, thereby notifying a user of incoming mail, or a registered schedule, or providing a variety of information.

As illustrated in FIG. 3 and so on, in first and second housings 1A and 1B, the face opposite the face SA and the face opposite the face SB are covered with the cover 14 and the cover 16 respectively. The cover 14 is made of a transparent or semitransparent material, and protects the face opposite the face SA and the first display unit 32 while permitting content displayed on the first display unit 32 to pass through it. The cover 16 is made of the same material as the cover 14, and protects the face opposite the face SB. The covers 14 and 16 may be of any color.

With regard to covers 14 and 16, the face opposite the face that is in contact with the first housing 1A and the face opposite the face that is in contact with the second housing 1B are provided with minute recesses and projections to prevent sliding. Among the sides, at least one end face (i.e., a face substantially perpendicular to a face that is in contact with the first housing 1A or second housing 1B) is smooth and flat. Therefore, the covers 14 and 16 allow leakage of incident light through the end face, thus adding a distinctive, beautiful feature to the appearance of the portable electronic apparatus 1.

Figure 4:
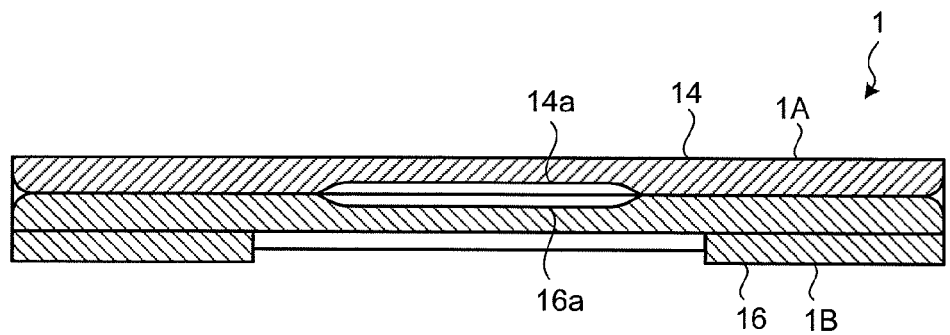
FIG. 4 is a front view of the portable electronic apparatus in a closed state.
Figure 5:
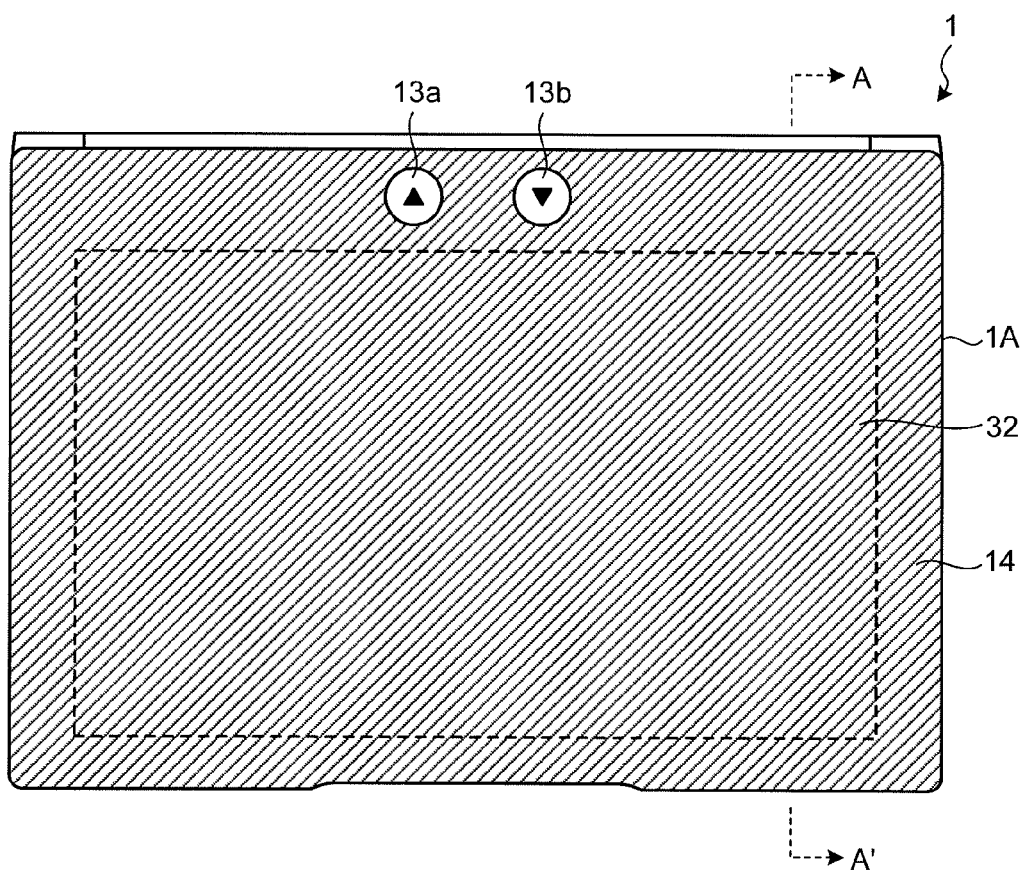
FIG. 5 is a plan view of the portable electronic apparatus in a closed state.

The covers 14 and 16 have another functional effect. As illustrated in FIG. 4 and so on, in the closed state, the cover 14 has a notch 14a in a portion that contacts the cover 16 at the side opposite the hinge mechanism 8. In the closed state, the cover 16 also has a notch 16a in a portion that contacts the cover 14 at the side opposite the hinge mechanism 8. Therefore, the portable electronic apparatus 1 in the closed state has a step opposite the hinge mechanism 8, the step corresponding to the thickness of the covers 14 and 16. This step functions as a part around which a user's finger is hooked when he or she opens the portable electronic apparatus 1 from its closed state. Just either one of the notches 14a and 16a suffices to function as a part around which a finger may be hooked.

Furthermore, as illustrated in FIGS. 3 and 6 and so on, the cover 16 has a rectangular notch 16b with its curved ends opposite the notch 16a, that is, near the boundary (i.e., near the rotation axis P) between the first and second housings 1A and 1B that is arranged in the open state of the portable electronic apparatus 1. Therefore, steps (projections) corresponding to the thickness of the cover 16 are formed at both ends of the notch 16b of the cover 16 and in a direction perpendicular to the boundary. These steps allow a user to hold the portable electronic apparatus 1 stably in both closed and open states.

Specifically, when using the portable electronic apparatus 1 in the closed state, a user may grip a part near the middle of the boundary between the first and second housings 1A and 1B that is defined in the open state of the apparatus 1, with one side of the first housing 1A pointing upwards. In this case, a finger of the hand gripping the apparatus 1 is caught by the step perpendicular to the boundary between the housings 1A and 1B. Thereby the position of the hand is prevented from moving in a longitudinal direction. The buttons 13a and 13b are disposed near the boundary so as to be easily operated by a finger of a hand holding the portable electronic apparatus 1 in the closed state.

When using the portable electronic apparatus 1 in the open state, a user may grip parts (of the second housing 1B) below the ends of the boundary between the first and second housings 1A and 1B with one or both of his or her hands, while the first housing 1A is positioned above the second housing 1B. In this case, a finger of the hand gripping the portable electronic apparatus 1 is caught by the step perpendicular to the boundary. Thereby, the position of the hand is prevented from being moved sideways. The buttons 13c and 13d are disposed near the left side of the second housing 1B so as to be easily operated with a finger of a left hand holding the portable electronic apparatus 1 in the open state. The buttons 13e and 13f are disposed near the right side of the second housing 1B so as to be operated easily with a finger of a right hand gripping the portable electronic apparatus 1 in the open state.

The advantageous effect of holding the portable electronic apparatus 1 is yielded not only by the cover 16 but also by the structure of the second housing 1B. As illustrated in FIGS. 10 and 11, the second housing 1B accommodates a charging battery 11, which is one of the heaviest components of the portable electronic apparatus 1, near the boundary between the first and second housings 1A and 1B that is defined in the open state of the apparatus 1 (i.e., near the rotation axis P). As described above, it is assumed that, when the portable electronic apparatus 1 is in use in either open or closed state, a part near the boundary between the first and second housings 1A and 1B that is defined in an open state is gripped with a hand. Accordingly, when the portable electronic apparatus 1 is in use, a part near the center of gravity is gripped and held stably in both open and closed states of the apparatus 1.

As illustrated in FIGS. 10 and 11, in order to accommodate the comparatively large charging battery 11 so as to ensure power source capacity, one part near the boundary between the first and second housings 1A and 1B that is defined in an open state (i.e., near the rotation axis P) is thicker than the rest. This thickness functions as a grip, thus making it easier for a user to grip the portable electronic apparatus 1. This thickness adds a three-dimensional figure to the opposite side of the face SB of the second housing 1B, thus increasing the mechanical strength of the second housing 1B.

Figure 12:
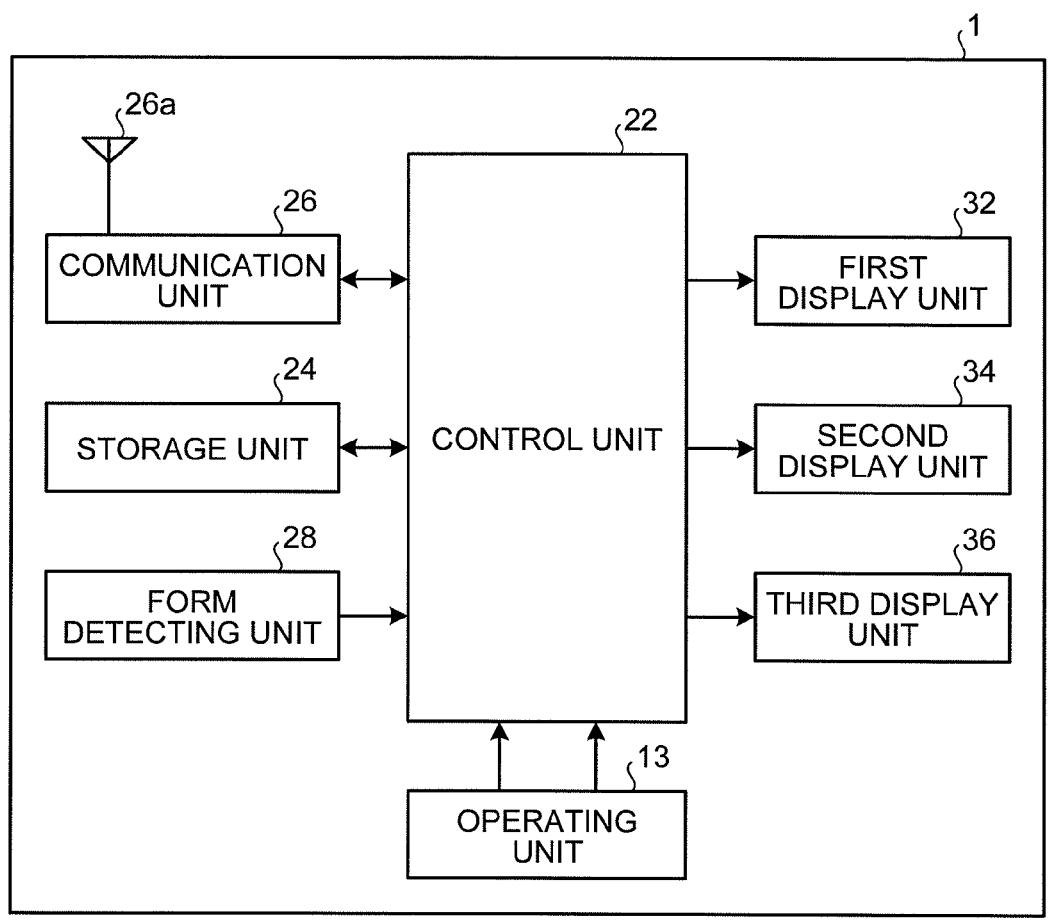
FIG. 12 is a block diagram illustrating the configuration of the portable electronic apparatus.

Next, the configuration of the portable electronic apparatus 1 will be described with reference to FIG. 12. FIG. 12 is a block diagram illustrating the configuration of the portable electronic apparatus 1. As illustrated in FIG. 12, the portable electronic apparatus 1 includes a control unit 22, a storage unit 24, a communication unit 26, a form detecting unit 28, an operating unit 13, the first display unit 32, the second display unit 34, and the third display unit 36.

The storage unit 24 is a storage device for storing a variety of information. The storage unit 24 may be one that stores information onto a recording medium, such as flash memory, fixedly provided in the portable electronic apparatus 1, or may be configured from a combination of a retrievable recording medium, such as a memory card, and a reading/writing device for the recording medium.

The storage unit 24 stores data and programs used for processing by the control unit 22. Examples of programs stored in the storage unit 24 include a program that provides a reading function for an electronic book, a program that provides a reading function for a WEB page, and a program that provides the function of changing the display content of the first display unit 32 or the like in conjunction with a change in the form of the portable electronic apparatus 1. Data stored in the storage unit 24 includes book data displayed on, for example, the first display unit 32, and a database storing a variety of information.

The communication unit 26 has an antenna 26a. This unit 26 establishes a wireless signal path of a Code Division Multiple Access (CDMA) system, or any other wireless communication protocols, between a base station and the communication unit 26 via a channel assigned by the base station, and carries out telephone communication and information communication between the base station and the communication unit 26. Any other wired or wireless communication or network interfaces, e.g., LAN, BLUETOOTH®, Wi-Fi, NFC (Near Field Communication) may also be included in lieu of or in addition to the communication unit 26. The operating unit 13 includes buttons 13a to 13i. When these buttons are operated by a user, the operating unit 13 generates a signal corresponding to the operation. The signal thus generated is input to the control unit 22 as an instruction to be given by a user.

The form detecting unit 28 detects any change in the form of the portable electronic apparatus 1, that is, a change to the open state of the portable electronic apparatus 1 from its closed state, or a change to the closed state from its open state, and inputs a signal indicating a detection result to the control unit 22.

As described above, the first display unit 32 has a display panel for holding the content of a display even after the supply of power has been stopped. This display unit 32 is exposed to the outside in both the closed and open states of the apparatus 1. As described above, the second and third display units 34 and 36 are configured so as to be able to display information via a combination of the display units 34 and 36 in the open state of the apparatus 1. In a closed state, the second and third display units 34 and 36 other than the above-mentioned part of the second display unit 34 cannot be viewed from outside.

Each of the first, second, and third display units 32, 34, and 36 may be a touch panel able to detect a finger, or the like, touching the display unit. In this case, any system such as a pressure-sensitive system or capacitive system may be used for detecting the touch of a finger, or the like, on the display screen. Touch panels adopted for the first display unit 32 and the like enable a user to turn a page, or select a character string, etc., by performing an operation intuitively, thereby improving usability. In addition, since the second and third display units 34 and 36 are located in the same plane in the open state of the apparatus 1, operations such as dragging or sweeping are easy to perform across the second and third display units 34 and 36.

The control unit 22 exerts integrally overall control of the entire operation of the portable electronic apparatus 1. Specifically, the control unit 22 controls the operations of the communication unit 26, first, second, and third display units 32, 34, and 36, and so on such that the various processes of the portable electronic apparatus 1 are performed in appropriate sequence according to signals, etc., input from the operating unit 13 and form detecting unit 28.

The control unit 22 performs a process based on a computer program (e.g., an operating system program, application program, etc.) stored in the storage unit 24. The control unit 22 includes, for example, a microprocessor unit (MPU) and performs various processes of the portable electronic apparatus 1 according to a procedure defined in the computer program. That is, the control unit 22 successively reads instruction sequences from a computer program stored in the storage unit 24, and performs these processes.

As part of the control of the portable electronic apparatus 1, the control unit 22 changes the contents of displays of the first display unit 32, etc., in conjunction with a change in the form of the portable electronic apparatus 1. This control is achieved by the control unit 22 with reading and executing programs stored in the storage unit 24.

Figure 13:
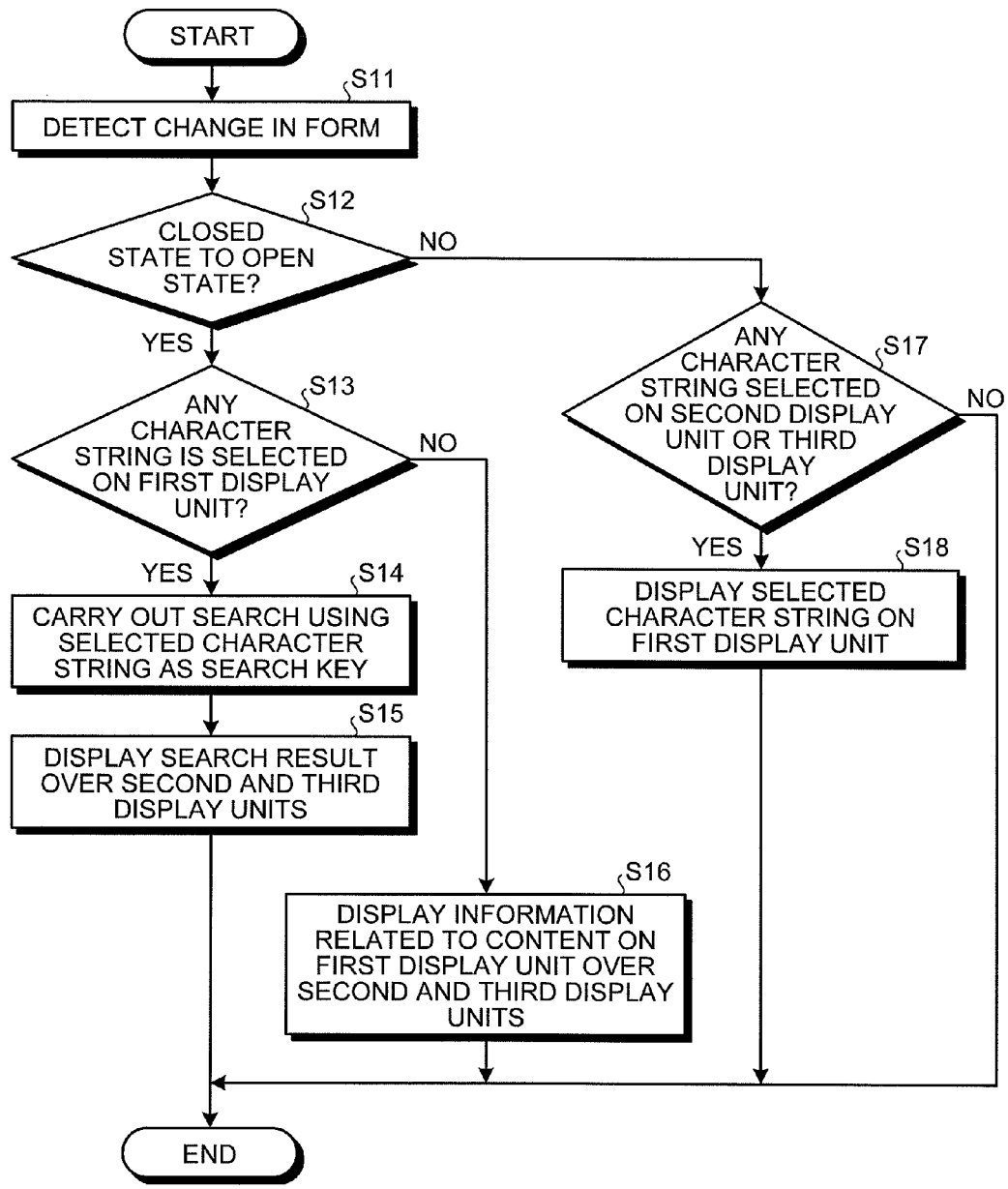
FIG. 13 is a flowchart illustrating a procedure for changing a display content on a display unit in conjunction with a change in the form of the portable electronic apparatus.

Referring to FIG. 13, next will be described a procedure for a control process for changing the contents of the displays of the first display units 32, etc., in conjunction with a change in the form of the portable electronic apparatus 1. FIG. 13 is a flowchart illustrating the procedure for this control process.

As illustrated in FIG. 13, upon detection of a change in the form of the portable electronic apparatus 1 by the form detecting unit 28 (Step S11), the control unit 22 determines whether the change is from a closed state to an open state (Step S12). If the change is from the closed state to the open state (Yes at Step S12), the control unit 22 determines whether there is any character string selected on the first display unit 32 (Step S13).

As described above, the first display unit 32 is visible from outside even in the closed state of the apparatus 1. Accordingly, even in the closed state, a user can read information shown on the first display unit 32. Additionally, a user is able to select a character string, i.e., item of information, shown on the first display unit 32, for example, by operating the buttons 13a and 13b. Where the first display unit 32 is configured as a touch panel, a user can select a required character string by sliding his or her finger on the surface of the first display unit 32. If part of a text displayed on the first display unit 32 is selected, the control unit 22 may change the display mode of the selected portion, for example, by reversing a display such that the selected portion can be distinguished from the other portions.

If any character string is selected on the first display unit 32 (Yes, at Step S13), the control unit 22 carries out a search using the selected character string as a search key (Step S14). The search used here may be a process of extracting information corresponding to the search key, from dictionary data, database, or the like, stored in the storage unit 24 in advance. Alternatively, the search may be a process of transmitting a search key to a server on a network providing a search service, asking for the search, and receiving the result of the search.

At Step S15, the control unit 22 displays the search result over the second and third display units 34 and 36; the search result may be shown on either one of the second and third display units 34 and 36.

The electronic paper or the like of the first display unit 32 is characterized by offering less of a burden on user's eyes and reduced power consumption even when viewed for a long time. Accordingly, the portable electronic apparatus 1 in the closed state is useful, for example, as a reading device for an electronic book. As described above, if the portable electronic apparatus 1 is opened from the closed state when a character string displayed on the first display unit 32 has been selected, the result of the search using the selected character string is displayed on, for example, the second display unit 34.

In this configuration, if a user encounters an unfamiliar word while reading an electronic book on the display device of the portable electronic apparatus 1 in the closed state, the word is selected, and then the portable electronic apparatus 1 is opened. Thereby, the search result for the word can be displayed on, for example, the second display unit 34.

By displaying a search result over the second and third display units 34 and 36, a wide area can be ensured for displaying information, thus enabling a user to view more information at one time. Additionally, the length of time that a search result is shown may be brief. Therefore, as display panels for the second and third display units 34 and 34, a liquid crystal display, organic EL panel display, or the like, which requires relatively high power consumption but is suitable for high speed display or color display, can be used, thus improving the visibility of a search result. In addition, in conjunction with the operation of exposing the second and third display units 34 and 36 by changing the form of the portable electronic apparatus 1, a search result is displayed. This eliminates the need for a user to perform any operation, such as depressing buttons, in order to start a search or display a search result.

If any character string is not selected on the first display unit 32 (No, at Step S13), the control unit 22 displays information related to the contents displayed on the first display unit 32, over the second and third display units 34 and 36. A place for displaying related information may be either the second or third display units 34 and 36.

In this case, if an electronic book is shown on the first display unit 32, information related to the contents displayed on the first display unit 32 may be, for example, the profile of the author of the electronic book, a diagram showing the correlations between the personages in the electronic book, or an illustration of a scene shown on the first display unit 32. Information related to a content displayed on the first display unit 32 may be included in advance in an electronic book or the like shown on the first display unit 32, or may be captured by radio communication as required.

At Step S12, if the detected change is from the open state to the closed state (No, at Step S12), the control unit 22 determines whether there is any character string selected on the second display unit 34 or third display unit 36 (Step S17).

A user can select a character string, which is an item of information shown by the second display unit 34 or third display unit 36, by operating buttons 13c to 13i, for example. Where the second and third display units 34 and 36 are configured as touch panels, a user can select a required character string by sliding his or her finger on the surface of the second display unit 34 or third display unit 36. If part of a text displayed on the second display unit 34 or third display unit 36 is selected, the control unit 22 may change display mode for the selected portion, for example, by reversing a display such that the selected portion can be distinguished from the other portion.

If there is any character string selected on the second display unit 34 or third display unit 36 (Yes, at Step S17), the control unit 22 displays the selected character string on the first display unit 32 (Step S18). If no character string is selected on either the second display unit 34 or third display unit 36 (No, at Step S17), the control unit 22 does not exert an update process for display content resulting from change in the form of the portable electronic apparatus 1.

If an image or the like is selected on the second display unit 34 or third display unit 36, the selected image or the like may be shown on the first display unit 32. If nothing is selected on the second display unit 34 or third display unit 36, information shown on the second display unit 34 or third display unit 36 or all the information shown over the second and third display units 34 and 36 may be shown on the first display unit 32.

As described above, in the open state of the portable electronic apparatus 1, a wide display area can be ensured by using the second and third display units 34 and 36 as a connected display. Additionally, the second and third display units 34 and 36 are suitable for high speed or color display, and so on. Accordingly, the portable electronic apparatus 1 in the open state is useful as a device for viewing moving pictures, reading a WEB page, or editing a variety of data.

However, continuous display of information on the second and third display units 34 and 36 requires considerable power consumption. Therefore, if a user using the portable electronic apparatus 1 in the open state finds information which he or she wants to read carefully or information he or she needs to check later, he or she can select the information and display it on the first display unit 32 by switching the form of the portable electronic apparatus 1 to the closed state. This makes it possible to maintain display of the information on the first display unit 32 while power consumption is reduced. Furthermore, a user does not have to perform any operation, such as depressing a button, to transfer the information to the first display unit 32 to write thereon.

It should be noted that any changes and modifications may be made to the configuration of the portable electronic apparatus 1 described above without departing from the spirit and scope of the present invention. For example, the numbers, dispositions, and functions of buttons, such as button 13a, are not limited to the foregoing embodiment.

In the foregoing embodiment, the first display unit 32 includes a display panel that has a memory function and the second and third display units 34 and 36 includes display panels that have no memory function. However, the display panel of each display unit does not have to be so. For example, the first display unit 32 may also include a display panel without memory function, and may be switched between display and non-display of information according by, for example, depression of a button. Also, each of the second and third display units 34 and 36 may include a display panel that has a memory function.

Figure 14:
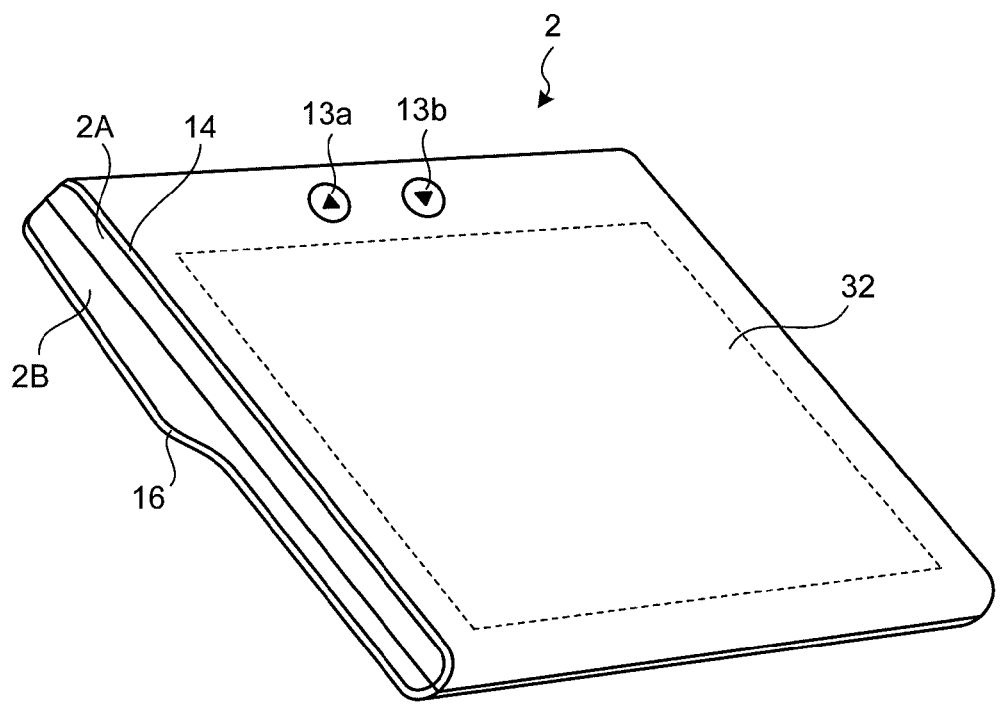
FIG. 14 is a perspective view of another portable electronic apparatus in a closed state.
Figure 15:
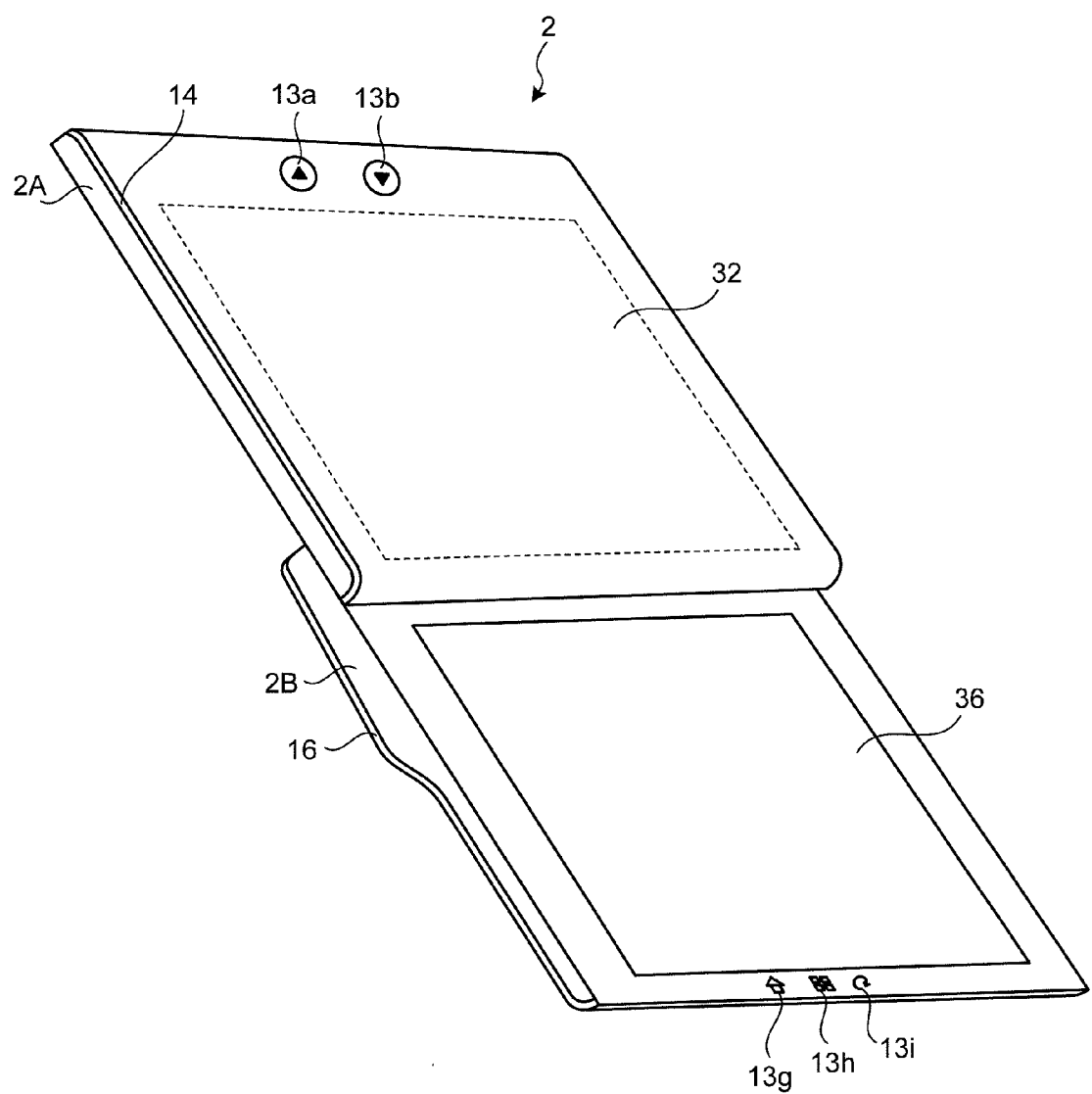
FIG. 15 is a perspective view of another electronic apparatus in an open state.

In the foregoing, a description was given of a portable electronic apparatus 1 that has a folding housing. However, the present invention can be applied to various types of portable electronic apparatus that change the way information is displayed according to a change in form of the apparatus. To be specific, the present invention can be applied to portable electronic apparatuses including a display unit that is exposed to the outside at least in an open state and another display unit that is exposed to the outside at least in a closed state. For example, as illustrated in FIGS. 14 and 15, the present invention can also be applied in a portable electronic apparatus 2 in which housings 2A and 2B are combined together so that one slides over the other such that the display unit 36 is not exposed in a closed state as illustrated in FIG. 14 and is exposed in an open state as illustrated in FIG. 15.

As described above, in a closed state, a portion of the second display unit 34 is exposed to the outside. By virtue of this, a part of information displayed on the second display unit 34 or third display unit 36 may be displayed on the exposed portion of the second display portion 34 in conjunction with a change in form from an open state to a closed state. Alternatively, instead of a portion of the second display unit 34, a portion of the third display unit 36 may be exposed in a closed state.

The advantages are that one embodiment of the invention provides a portable electronic apparatus that can be used for a wider variety of purposes while achieving power saving.

What is claimed is:

1. A portable electronic apparatus, comprising:
    a housing configured to change from a first form to a second form or from the second form to the first form;
    a first display unit exposed to outside in the first form and configured to display first information;
    a first operating unit exposed to the outside at least in the first form;
    a second display unit exposed to the outside in the second form and configured to display second information;
    a second operating unit exposed to the outside in the second form;
    a form detecting unit for detecting the change of the housing from the first form to the second form or from the second form to the first form; and
    a control unit configured to, in response to the form detecting unit detecting the change of the housing from the first form to the second form,
       perform a searching process for a portion of the first information on the first display unit by asking a server, which provides a search service, on a network for a search, and receiving a search result from the server, and
       display the search result of the searching process as the second information on the second display unit.

2. The portable electronic apparatus according to claim 1, further comprising
    a third display unit exposed to the outside at least in the second form, wherein
    the second display unit and the third display unit are configured to display the second information.

3. The portable electronic apparatus according to claim 1, further comprising a storage unit for storing a database, wherein
the searching process further comprises searching the database.

4. The portable electronic apparatus according to claim 1, further comprising a communication unit for communicating with the server over the network.

5. The portable electronic apparatus according to claim 1, wherein
the second display unit has a portion exposed in the first form, and
the control unit is configured to display at least a part of the second information on the portion of the second display unit in conjunction with a change from the second form to the first form.

6. The portable electronic apparatus according to claim 1, wherein when the form detecting unit detects the change of the housing from the first form to the second form,
if no portion of the first information is selected from the first display unit, the control unit is configured to display the first information on the first display unit as the second information on the second display unit.

7. The portable electronic apparatus according to claim 6, further comprising a third display unit exposed to the outside at least in the second form, wherein
the second information is displayed over the second display unit and the third display unit.

8. The portable electronic apparatus according to claim 1, wherein when the form detecting unit detects the change of the housing from the second form to the first form,
if no portion of the second information is selected from the second display unit, the control unit is configured to display all the second information on the second display unit as the updated first information on the first display unit.

9. The portable electronic apparatus according to claim 1, wherein the first display unit is provided with no light-emitting source.

10. The portable electronic apparatus according to claim 1, wherein the control unit is configured to perform the searching process for the portion selected from the first information on the first display.

11. The portable electronic apparatus according to claim 1, wherein the control unit is further configured to display a portion of the second information on the first display unit as the updated first information when the form detecting unit detects the change of the housing from the second form to the first form.

12. The portable electronic apparatus according to claim 11, wherein the control unit is configured to display the portion selected from the second information on the first display unit as the updated first information.

* * * * *